United States Patent [19]

Maynard et al.

[11] Patent Number: 4,947,786
[45] Date of Patent: Aug. 14, 1990

[54] OVERHEATED-AXLE INDICATOR DEVICE

[76] Inventors: Raymond L. Maynard, 14935 Holmes St., Omaha, Nebr. 68137; Donald D. Neitzke, 640 N. 46th St. (Apt. 4), Omaha, Nebr. 68132

[21] Appl. No.: 351,531
[22] Filed: May 15, 1989
[51] Int. Cl.⁵ ............................................. G01K 11/06
[52] U.S. Cl. ................................... 116/218; 116/217; 116/281; 116/283
[58] Field of Search ............... 116/101, 106, 216–218, 116/281, 283, DIG. 38; 246/169 A; 374/160

[56] References Cited

U.S. PATENT DOCUMENTS

| | | | |
|---|---|---|---|
| 2,065,614 | 12/1936 | Scribner | 116/214 |
| 2,400,399 | 5/1946 | Down et al. | 246/165 A |
| 2,694,997 | 11/1953 | Alger, Jr. | 116/106 |
| 3,197,632 | 7/1965 | Baughman | 116/202 |
| 3,401,666 | 9/1968 | Munroe | 116/218 |
| 3,442,249 | 5/1969 | Jamison et al. | 116/217 |
| 3,456,614 | 7/1969 | Hampton | 116/218 |
| 3,811,402 | 5/1974 | Keeley et al. | 116/218 |
| 4,119,284 | 10/1978 | Belmont | 246/169 A |
| 4,818,119 | 4/1989 | Busch et al. | 374/208 |

FOREIGN PATENT DOCUMENTS 120007 10/1947 Sweden ........................ 116/106

Primary Examiner—William A. Cuchlinski, Jr.
Assistant Examiner—W. Morris Worth
Attorney, Agent, or Firm—George R. Nimmer

[57] ABSTRACT

A perilously overheated-axle of an over-the-road motor vehicle can be sensed with a novel temperature responsive gauge of the fusible link and spring-loaded button type. When an over-heated-axle melts the gauge fusible link and propels the gauge spring-loaded button toward a plunger surrounded by a tubular fitting for the axle hubcap plug, the plunger is rammed forwardly of the hubcap plug to provide a visually discernible warning that the axle has perilously overheated and requires immediate corrective servicing.

11 Claims, 2 Drawing Sheets

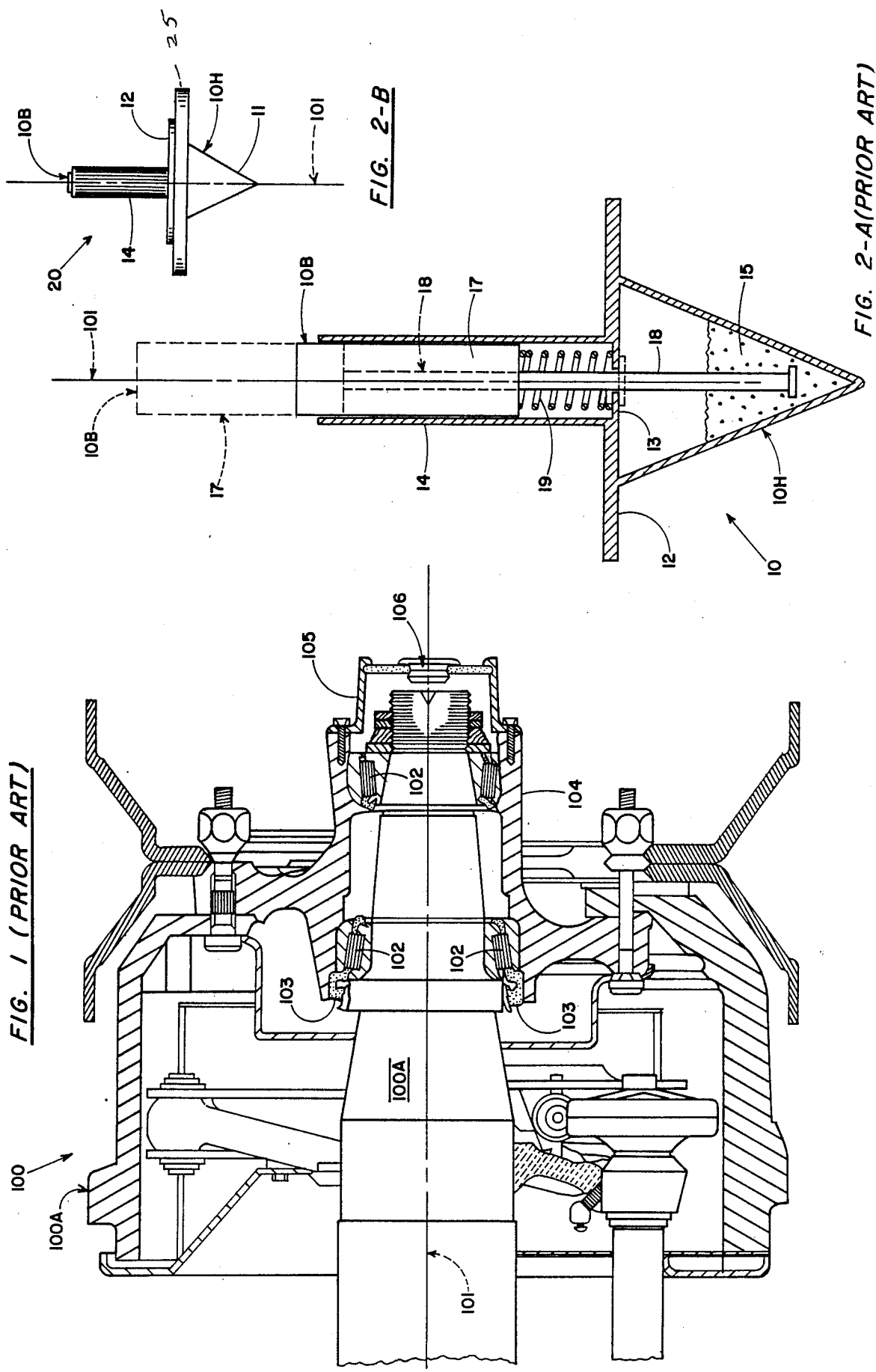

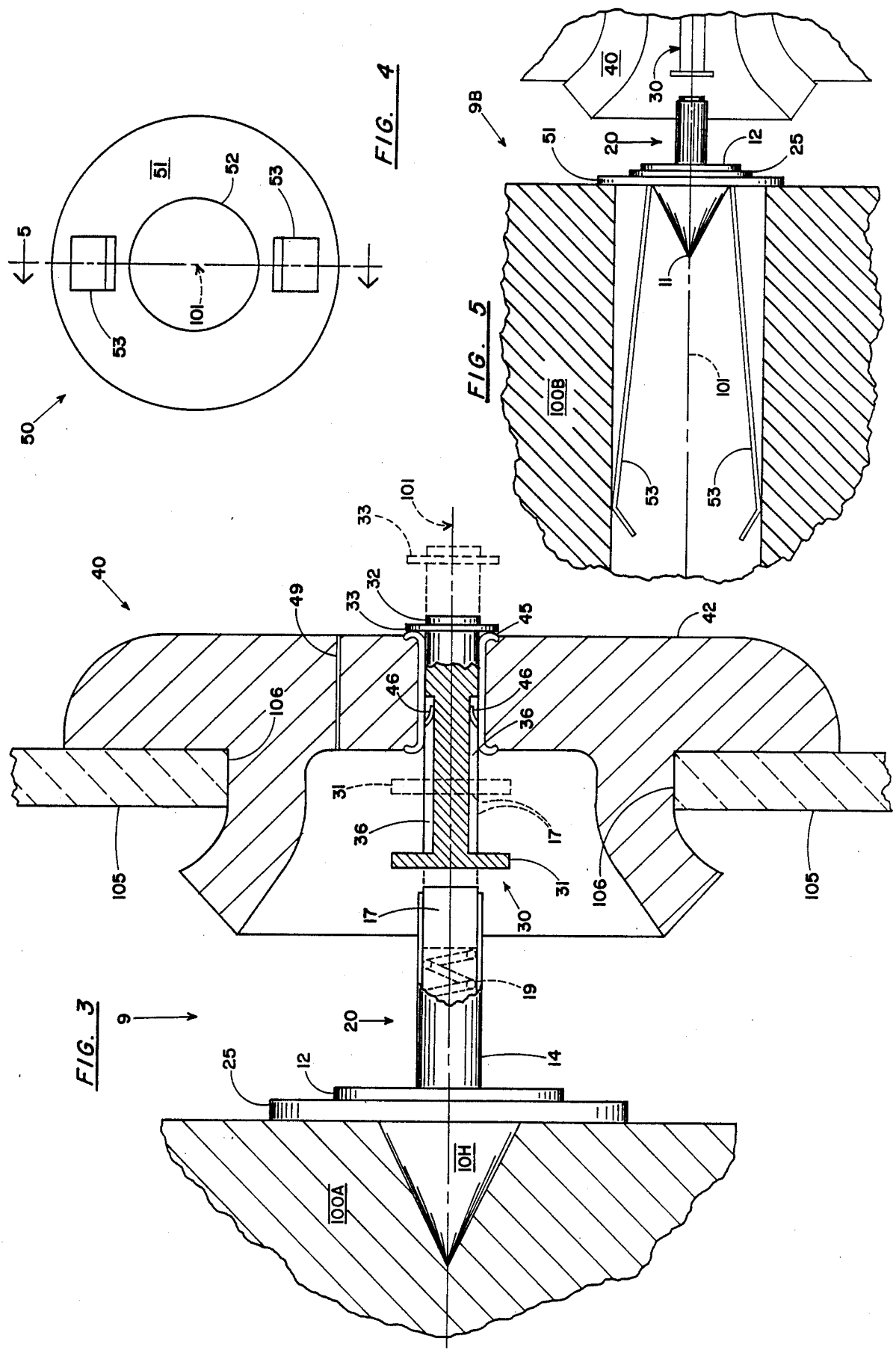

OVERHEATED-AXLE INDICATOR DEVICE

BACKGROUND OF THE INVENTION

Wheeled axles of the over-the-road vehicles, and especially for cargo-laden trucks and trailers, can be subjected to overheated axle conditions. Among the various causes of overheated-axles are: loss of lubricant seals at the wheel hub, improperly installed or maintained wheel hub bearings, malfunctioning brakes, etc. If permitted to persist over prolonged roadway travel, axle overheating can eventually reach such high temperatures that the wheel hub will bind to the axle and with perilous consequences to the vehicle as well as to its cargo and driver.

GENERAL OBJECTIVE OF THE INVENTION

It is accordingly the general objective of the present invention to provide an economical and reliable overheated-axle indicator device that will indicate that a wheeled axle is becoming overheated and needs immediate servicing to prevent further and potentially disastrous overheating. Within the purview of the general objective is to alert the vehicle operator at periodic roadway stopovers (e.g. at weigh stations, rest stops, etc.) that a wheeled axle is becoming overheated and needs servicing to prevent perilous overheating.

GENERAL STATEMENT OF THE INVENTION

With the aforementioned general objective in view, and together with other ancillary and specific objectives which will become more apparent as this description proceeds, the overheated-axle indicator device of the present invention is employed in endward combination with a selectable conventional vehicular axle and generally comprises: a temperature responsive gauge of the fusibly linked and spring-loaded button type and which is removably and preferably magnetically attached to the axle whereby axle overheating will fuse the link and propel the spring-loaded button away from the axle and toward an annular hubcap; a centrally-open plug removably attached within the hubcap annulus, said plug having an exposed frontal-end and at its central-opening being provided with a novel tubular fitting; and a plunger slidably surrounded by the plug tubular fitting, the plug having a trail-end confronting the gauge button and having an exposed lead-end located adjacent the plug frontal-end, the tubular fitting including the capability for preventing the plunger from assuming an indicator mode beyond the plug frontal-end until the plunger is rammed by the gauge button upon melting of the gauge fusible link by axle overheating.

BRIEF DESCRIPTION OF THE DRAWING

In the drawing, wherein like characters refer to like parts in the several views, and in which:

FIG. 1 schematically depicts in sectional elevational view a typical "solid" axle environment for the overheated-axle indicator device of the present invention;

FIG. 2A is a sectional elevational view of a prior art temperature responsive gauge;

FIG. 2B is an elevational view of a temperature responsive gauge akin to the prior art but modified for usage within the overheated-axle indicator device of the present invention;

FIG. 3 is a sectional elevational view of a representative embodiment of the overheated-axle indicator device of the present invention in the FIG. 1 "solid" axle environment;

FIG. 4 is a rearward elevational view of an adapter member for usage with a "hollow" axle environment for the overheated-axle indicator device of the present invention; and FIG. 5 is a sectional elevational view showing the overheated-axle indicator device employed with the FIG. 4 adapter member in a "hollow" axle environment.

DETAILED DESCRIPTION OF THE DRAWING

Drawing FIG. 1 schematically depicts the terminal region of a conventional vehicular axle-assembly comprising an axle 100 extending directionally longitudinally along a central-axis 101 having an endward opening. In FIG. 1, the axle depicted is of the so-called "solid" type 100A (i.e. having an endward chamfer type endward opening. Alternatively, the axle might be of the so-called "hollow type 100B (i.e. wherein an axial bore provides the axle endward opening). A wheel hub 104, by virtue of bearings 102, revolvably surrounds axle 100, and hub 104 is provided with lubricant seals 103. An annular hubcap 105 is attached to revolvable hub 104 and through which closeable hub opening (106), bearing lubricant can be injected.

The temperature responsive gauge 10 of FIG. 2A is suggested by the prior art (e.g. U.S. Pat. No. 3,811,402) and conventionally comprises a housing member 10H and a button member 10B. Housing member 10H includes: a circularly annular front-wall 12 surrounding longitudinally extending central-axis 101; tapered-sidewall means 10H attached to front-wall 12 and converging rearwardly therefrom toward an apexial rear-end 11; and tubular-sidewall means 14 attached to front-wall 12 and extending forwardly therefrom concentrically about central-axis 101. Button member 10B extends along central-axis 101 and includes a button 17 surrounded by tubular-sidewall 14 and a button-stem 18 extending rearwardly therefrom toward housing rear-end 11. Surrounding button-stem 18 and confined between button 17 and front-wall 12 is a helical spring 19. Spring 19 is maintained in compression inasmuch as the rearward extremity of the button stem 18 is weldably attached to housing rear-end 11 with a fusible link 15 of eutectic metals. Thus, and as indicated in FIG. 2A phantom lines, whenever the fusible link (15) is subjected to melting heat, helical spring 19 is relieved of compression and propels button 17 forwardly away from housing front-wall 12.

As will become apparent from drawing FIGS. 2B and 3, a representative embodiment (9) of the overheated-axle indicator device generally comprises: a modified form (e.g. 20) temperature responsive gauge; a centrally-open plug (40) for the vehicle axle hubcap (105); and for such plug, a tubular fitting (45, 56) that surrounds a plunger (30) adapted to assume an indicator mode located prominently forwardly of the plug whenever an overheated axle melts the gauge fusible link.

The overheated-axle indicator device (e.g. 9) of the present invention requires a novel temperature responsive gauge more sophisticated than prior art gauges (e.g. of FIG. 2A) and specifically requires means for attaching the gauge to the vehicular axle. In the latter vein, and as alluded to in FIG. 2B, adhesively or otherwise attached to the gauge housing is a radial-extension, preferably of disc-like configuration. Such radial-extension (e.g. 25) can in turn be adhesively attached to axle 100A or to an adapter 50 for an axle 100B. Alternatively, if such axle 100A or adapter 50 is fabricated of magnetically-permeable material, the radial extension (25) is advantageously provided of magnetic material. The eutectic mix for link 15 of modified gauge 20 is empirically selected to melt within the range of 200° F. to 225° F., and which temperature range is indicative that the vehicular axle (100A, 100B) is becoming overheated. For example, a eutectic metallic mixture of: 50% bismuth; 28% lead; and 22% tin; has an acceptable melting point of substantially 212° F.

The preponderant length of plunger 30, which extends along central-axis 101, is of a cylindrical shape that includes lead-end 32 and at least one (and preferably two) keyways 36 therealong. The plunger is provided with a flanged trail-end 31 that confronts, but is spaced from, gauge button 17.

The tubular fitting for plug 40 includes a tubular grommet portion 45 surrounding central-axis 101 and engaged in eyelet fashion with the plug central-opening. Such tubular fitting also includes a spring means (46) attached to tubular grommet 45 and extending into each keyway 36 of plunger 30.

The spatial inter-relationship for components 20, 30, and 40, of embodiment 9 at its FIG. 3 stable mode (solid lines) comprises:

(a) novel gauge 20 is magnetically (e.g. 25) attached to the end of "solid" type axle 100A whereby its tapered-sidewall extends into the axle central chamfer. In this condition, the gauge tubular-sidewall 14 and button 17 surround central-axis 101 and are located forwardly of axle 100A;

(b) the plunger trail-end 31 being spaced a small finite gap forwardly of gauge button 17, and plunger lead-end 32 being located adjacently nearby plug frontal-end 42. Preferably, said plunger, immediately behind its lead-end 32, carries a gasket 33 that serves to sealably protect tubular fitting 45 and to visually emphasize the plunger indicator mode (phantom lines); and (c) the plug fitting spring means (46) bearing into the the forward length portion of each keyway 36.

The said fitting spring means (46) prevents plunger 30 from sliding along central-axis 101 until (and as indicated in phantom line of FIG. 3) an overheated-axle melts link 15 whereupon spring 19 propels gauge button 17 against plunger flange 31. When gauge button 17 thusly rams plunger 30, the plunger lead-end 32 is enabled to assume the phantom line indicator mode located prominently forwardly of plug frontal-end 42. As previously mentioned, the gasket 33 carried by plunger 30 visually emphasizes the indicator mode.

Accordingly, whenever the driver of an over-the-road vehicle reaches a rest stop, he/she will circumnavigate the hubcaps (105) of the various axles to inspect for a plunger (32, 33) protruding prominently beyond a plug frontal-end 42. The existence of a protruding plunger indicates that that particular axle end has been overheated and needs servicing and/or repair. Ancillary to axle servicing and/or repair, the temperature responsive gauge 20 needs to be replaced with a fresh gauge having a button-stem 18 welded with a fusible link 15 to the gauge housing 10H.

Although the indicator device embodiment 9 of FIG. 3 is analagously employable with a so-called "hollow" axle 100B, temperature gauge stability at the endward region of a "hollow" axle is enhanced by utilizing an adapter member 50 depicted in FIGS. 4 and 5. Adapter member 50 comprises an annular plate 51 surrounding central-axis 101 and a pair of spring prongs 53 attached to and extending rearwardly from plate 51. Thus, by virtue of such springy prongs 53, adapter member is removably but securely seatable within the axial bore of a "hollow" type axle 100B. Accordingly, and as indicated in FIG. 5, the novel temperature responsive gauge (20) is very stably mountable at the axle endward region. In this regard, the tapered-sidewall of gauge housing 10H can be embraced at adapter plate opening 25 and the gauge radial-extension 25 can at adapter plate 51 effect attachment with adapter member 50. For example, if adapter member 50 is provided of magnetically-permeable material, gauge radial-extension 25 might be aptly provided of magnetic material. In all other respects, indicator embodiment 9B of FIG. 5 operates analagously with embodiment 9 of FIG. 3.

From the foregoing, the overheated-axle indicator device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. In combination with the terminal region of a vehicular axle-assembly extending longitudinally along a central-axis and comprising an axle having an endward opening that confronts an annular hubcap surrounding said central-axis, an overheated-axle indicator device comprising:

(A) a temperature responsive gauge and means to removably attach said gauge to the axle adjacent the endward opening thereof, said gauge comprising:
  (i) a longitudinally extending housing having a front-end and also having a rear-end extending into the axle endward opening, and
  (ii) a button at the housing front-end and being attached to a rearwardly extending stem that is surrounded by a compression-spring, and said stem being welded adjacent the housing rear-end with a fusible link whereby an overheated axle will melt the link and thereby enabling the compression-spring to propel the button forwardly away from the gauge housing and toward said annular hubcap;

(B) a centrally-open plug removably attached within the hubcap annulus, said plug having a frontal-end and at its central-opening carrying a tubular fitting that surrounds said central-axis and that is provided with a spring means; and (C) extending along said central-axis and being slidably surrounded by the plug tubular fitting, a plunger having a trail-end confronting the gauge button and having a lead-end located adjacent the plug frontal-end, said fitting spring means preventing said plunger from sliding along said central-axis until an overheated-axle forwardly propels the gauge button against the plunger whereupon the plunger is moved into an indicating position wherein the lead-end of the plunger extends forwardly beyond the plug frontal-end.

2. The combination of claim 1 wherein the means to removably attach the gauge includes a radial extension.

3. The combination of claim 2 wherein the radial-extension is-of disc-like configuration.

4. The combination of claim 3 wherein the disc-like radial-extension is magnetic and provides a magnetic-type removable attachment of the gauge to the axle adjacent the endward opening thereof.

5. The combination of claim 1 wherein the plunger is provided with at least one longitudinally extending keyway and wherein the tubular fitting's spring means extends into said plunger keyway.

6. The combination of claim 5 wherein the plunger is provided with a pair of diametrically opposed keyways and wherein the tubular fitting is provided with diametrically opposed spring means respectively extending into a plunger keyway.

7. The combination of claim 6 wherein the means to removably attached the gauge adjacent the axle endward opening a magnetic element carried by the gauge housing.

8. The combination of claim 1 wherein the axle endward opening is provided by a longitudinally extending cylindrical bore and said means to removably attach said gauge includes a centrally-open adapter member having axle engaging means seated within the axle bore; and wherein the temperature responsive gauge is removably attached to said adapter member.

9. The combination of claim 8 wherein the adapter member is fabricated of magnetically-permeable material and is frictionally seated within the axle bore by said axle engaging means; and wherein the gauge is magnetically attached to the adapter member.

10. The combination of claim 9 wherein the axle engaging means of said adapter member comprises a pair of springy prongs located within and resiliently bearing against the axle bore.

11. The combination of claim 1 wherein the plunger at a location forwardly of the plug frontal-end is provided with an annular gasket surrounding and extending radially outward from said plunger that abuttably shields the tubular fitting and also serves to visually enhance perception of the plunger in the indicating position.

* * * * *